Figure 1:
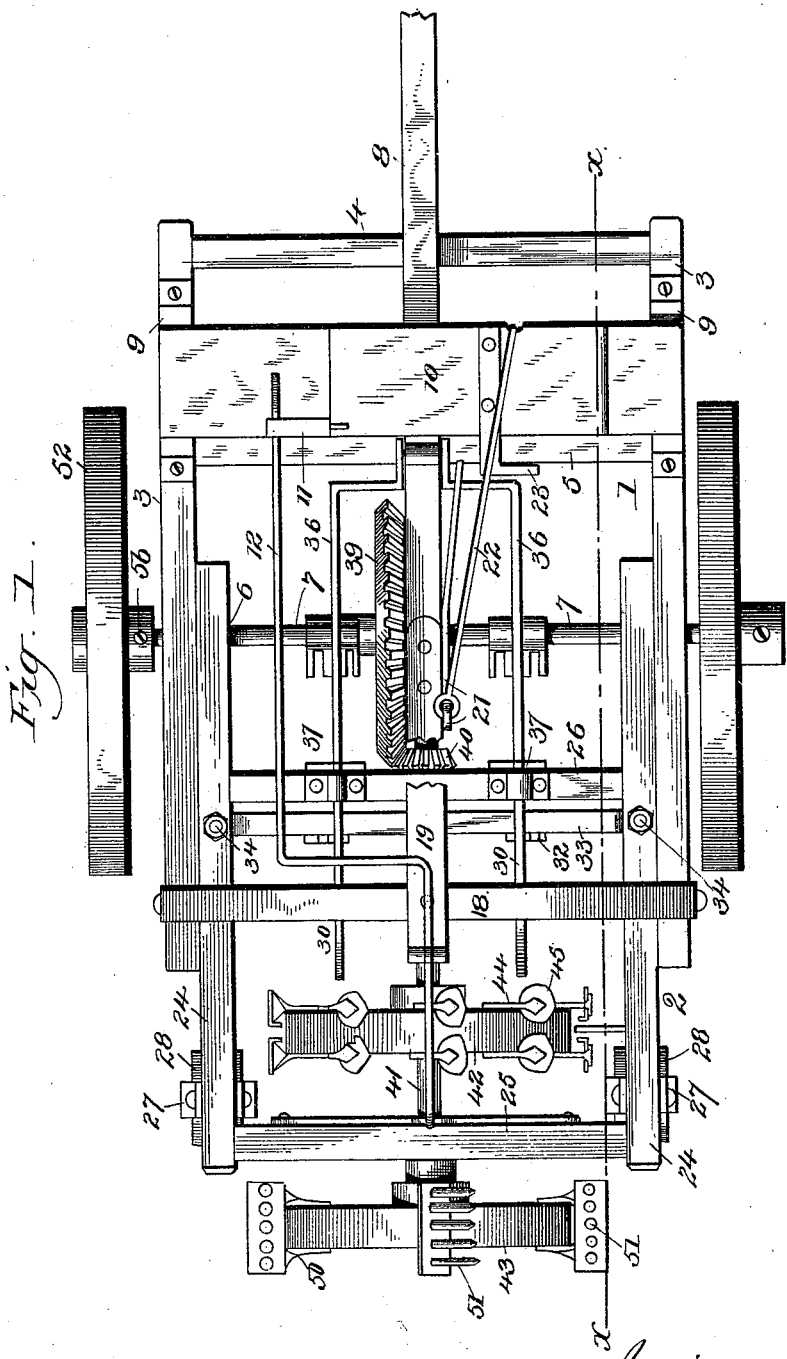

(No Model.) 3 Sheets—Sheet 1.

J. A. ALEXANDER.
COMBINED SCRAPING, CHOPPING, AND CULTIVATING MACHINE.

No. 546,801. Patented Sept. 24, 1895.

Witnesses
J. W. Reynolds
L. G. Randall.

Inventor
Julius A. Alexander
By John Wedderburn
his Attorney (No Model.) 3 Sheets—Sheet 2.
J. A. ALEXANDER.
COMBINED SCRAPING, CHOPPING, AND CULTIVATING MACHINE.
No. 546,801. Patented Sept. 24, 1895.
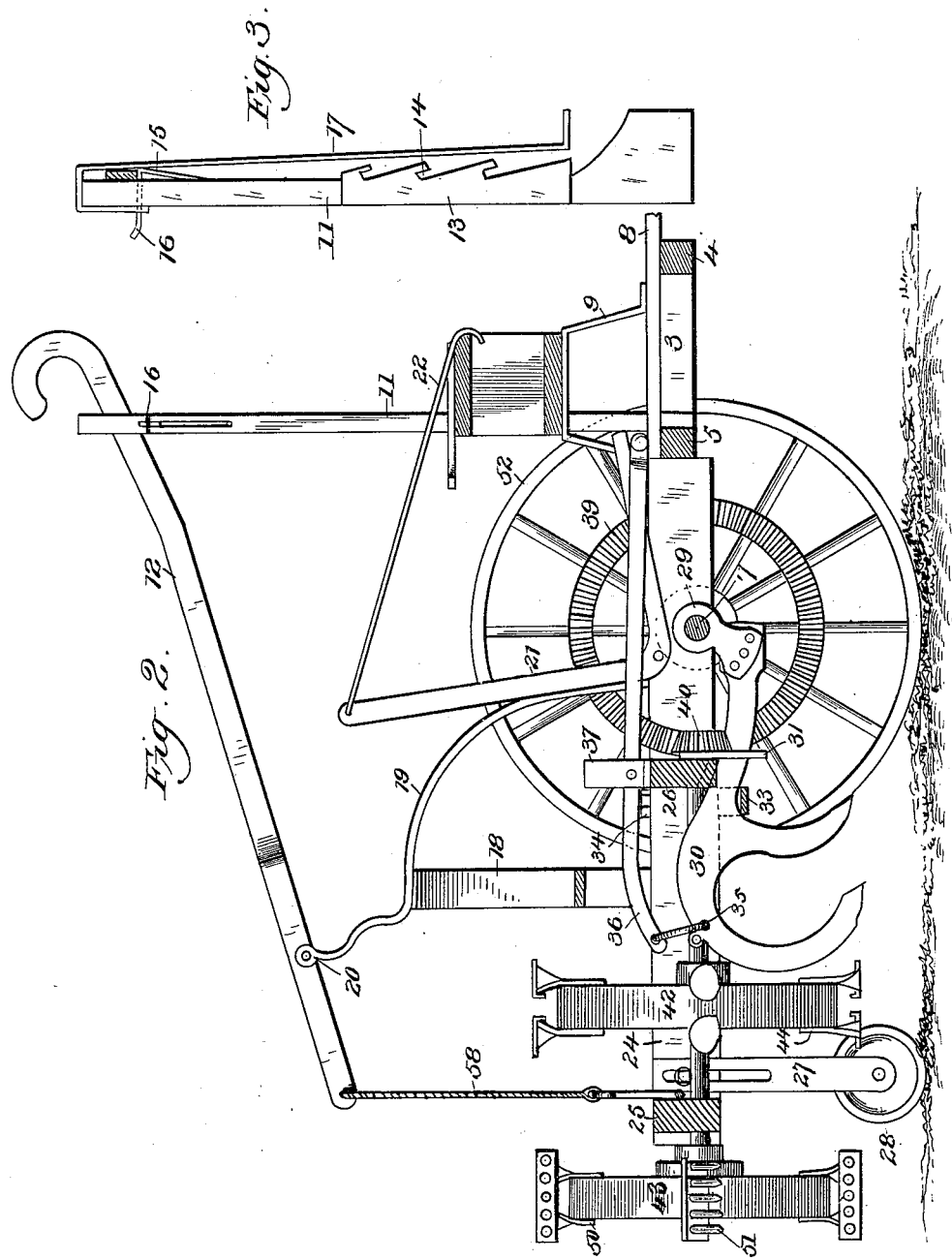
Witnesses
J. W. Reynolds
L. G. Randall
Inventor
Julius A. Alexander
By John Wedderburn
his Attorney (No Model.) 3 Sheets—Sheet 3.
J. A. ALEXANDER.
COMBINED SCRAPING, CHOPPING, AND CULTIVATING MACHINE.
No. 546,801. Patented Sept. 24, 1895.
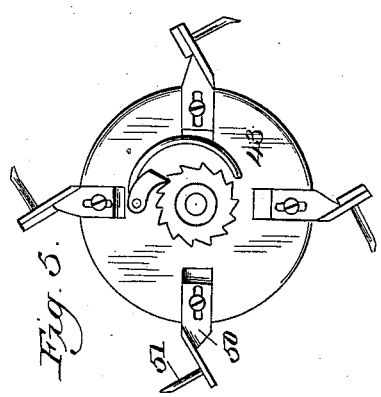
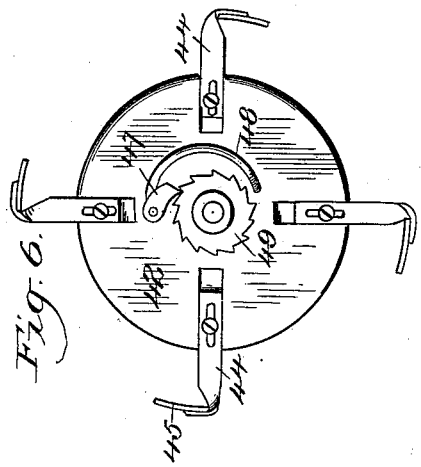
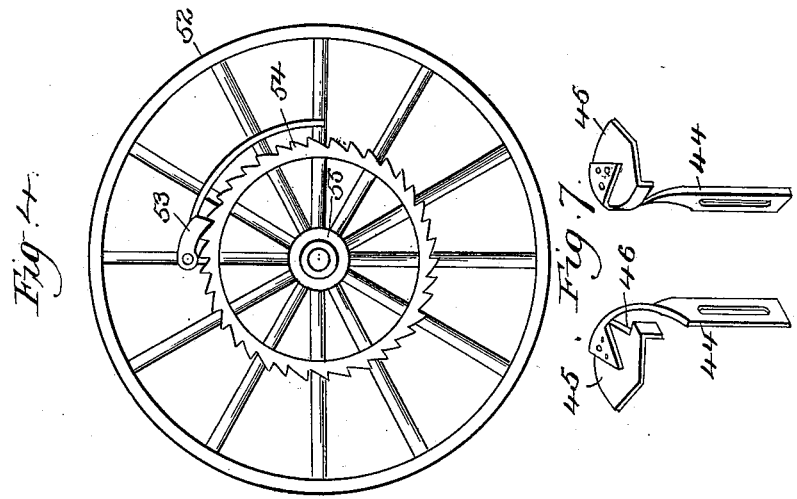
Witnesses
J. W. Reynolds
L. G. Randall
Inventor
Julius A. Alexander
By John Wedderburn
his Attorney

UNITED STATES PATENT OFFICE.

JULIUS A. ALEXANDER, OF PINE BLUFF, ARKANSAS.

COMBINED SCRAPING, CHOPPING, AND CULTIVATING MACHINE.

SPECIFICATION forming part of Letters Patent No. 546,801, dated September 24, 1895.

Application filed October 30, 1894. Serial No. 527,445. (No model.)

*To all whom it may concern:*

Be it known that I, JULIUS A. ALEXANDER, a citizen of the United States, residing at Pine Bluff, in the county of Jefferson and State of Arkansas, have invented certain new and useful Improvements in a Combined Scraping, Chopping, and Cultivating Machine; and I do hereby declare the following to be a full, clear, and exact description of the invention, such as will enable others skilled in the art to which it appertains to make and use the same.

My invention relates to improvements in combined scraping, chopping, and cultivating machines, having for its object to provide a machine adapted for the cultivation of corn and cotton embracing plows, choppers, and cultivators and automatic means for operating the same.

With these and other objects in view the invention consists of the construction of parts and arrangements of instrumentalities, which will be hereinafter more fully set forth and claimed.

In the drawings forming a part of this specification, Figure 1 is a plan view of the machine embodying my improvements. Fig. 2 is a section of the same on the line $xx$ of Fig. 1. Fig. 3 is a detail front view of the upright supporting the operating-lever for the rear of the machine. Figs. 4, 5, and 6 are detached views, respectively, of the main drive-wheel, the cultivator-disk, and the chopper-disk. Fig. 7 is a detail view of the chopping-hoes.

Similar numerals of reference indicate similar parts in the various views.

The machine is of double sulky type, with a frame mounted upon two main driving-wheels and two smaller trailing wheels at the rear thereof. This frame is made of two parts 1 and 2. The front part 1 is composed of two side beams 3 3, connected at the forward end thereof by two cross-beams 4 and 5 and having boxes or bearings 6 therein about midway of their ends, through which the main shaft 7 of the machine passes. Suitably secured to the front part 1 of the frame is the tongue 8 of the machine. The said frame 1 also carries the brackets 9, supporting the seat 10. Rising from one side of the seat 10 and secured to the frame 1 is an upright or standard 11 for supporting the free end of the lever 12 for elevating the rear parts of the machine. This upright 11 has secured to it and extending along the lower end thereof a plate 13, having notches 14 therein projecting beyond the side of the said upright and pointed downwardly. It is also provided with a spring-stop 15, having a handle 16, extending through said upright, whereby the free end of the lever 12 is held in its upper or raised position and conveniently released. The guide-piece 17 retains the lever 12 in engagement with the upright.

To the rear of the side beams 3 3 is secured a bow-brace 18, which is itself supported at its center by the brace 19, secured to the central part of the frame 1. The brace 19 is extended rearwardly and terminates in a yoke 20, in which is fulcrumed the lever 12 before referred to.

21 is an angle-lever pivoted for movement in a vertical plane in the central part of the frame 1, and is adapted to be operated from the seat 10 by a rod 22, which has a hook on its front end, adapted to engage a notch in the seat 10 to hold said angle-lever in its forward position. A plate having an arm 23 thereon is fastened to said seat, with which the rod 22 engages and limits the rearward movement of said angle-lever.

The rear part 2 of the frame is made up of two side beams 24 24 and two cross-beams 25 and 26, connecting the same. The forward parts of said side beams have bearings therein, through which the main drive-shaft passes, making a pivotal connection with the latter. At the rear of the said side beams 24 are two depending brackets 27, which carry the rear trailing wheels or rollers 28 28. These brackets may have means for adjusting them up and down for the obvious purpose of raising or lowering the machine, and thereby fit or suit the different heights of the corn or cotton beds.

Attached to collars 29 on the main shaft 7 and extending rearwardly therefrom are two double-footed plow-beams 30, moving between guides 31, depending from the cross-beam 26, and resting in similar guides 32 on the cross-bar 33, secured to the under sides of the side beams 24 24 of the frame 2. This cross-bar is suspended from the beams 24 by screw-bolts 34, passing therethrough, the said bolts having nuts thereon, by means of which the said cross-bar may be adjusted up or down, and thereby regulate the downward movement of the said plow-beams 30. Pivoted to the upper rear portion of these plow-beams, through slots 35 therein, are the two arms of a yoked lever 36, fulcrumed in brackets 37 37 on the cross-beam 26 and extending to the forward part of the machine, the yoke thereof passing beneath the angle-lever 21, by which it is engaged. By this construction it will be seen that by a forward movement of the rod 22 the angle-lever 21 is operated, and through it and the yoked lever 36 the plow-beam 30 is raised from the ground, and may be retained in its raised position by securing said rod 22 to the notch in the seat 10. Upon the release of this rod the plow is permitted to resume its normal position.

Keyed to the main shaft 7 is a bevel gear-wheel 39, which meshes with a smaller gear-wheel 40 at the front end of a centrally-located longitudinal shaft 41, mounted for rotation in the cross-beams 25 and 26. This shaft has loosely mounted thereon two wheels 42 and 43, the front one thereof 42 having a plurality of radially-extending arms 44 on each side thereof, which carry double chopping-hoes 45 45, having their outer edges slightly tapered, so as to cut on both sides of the corn or cotton hill and make a V-shaped cut, which will prevent the ground from caving or breaking off and letting the cotton fall down, which would be done with a square or abrupt cut. The stand of corn or cotton is made by the space between the two hoes making up a pair, and to regulate the width of the stand I make the said hoes 45 adjustable longitudinally by means of slots in the wheel 42, engaged by bolts passing therethrough. The rear hoe of a pair is cut away on its inner side, as shown at 46, thereby making the space between the hoes wider at this point, the purpose of which is to allow the hoe to cut through the drill and make its exit from the ground without throwing dirt on the young corn or cotton, which would naturally be done by a hoe of ordinary construction owing to the fact that as the machine moves forward on the row the hoes, revolving, cut a little diagonally across the row. The wheel 42 has a pawl 47 pivoted thereto, actuated by a spring 48 and engaging a ratchet-wheel 49, secured to the longitudinal shaft 41. By this means the motion of the said shaft is transmitted to said wheel 42 and an adjustment of said wheel on said shaft is permitted. The rear wheel 43 has a similar pawl thereon engaging a similar ratchet, thereby giving it a similar motion and providing a similar adjustment. It is further provided with a plurality of radial arms 50, carrying cultivating-teeth 51. The adjusting mechanism just described enables a relative adjustment of the wheels 42 and 43 to be made, whereby the cultivating-teeth 51 pass directly between the hills of corn or cotton and cultivate the same laterally. This produces a novel means of culture which is more thorough and beneficial than the old methods.

52 represents the front wheels of the machine, loosely mounted on the main shaft 7, having a spring-pawl 53 thereon, engaging a ratchet-wheel 54, secured to said shaft, the mechanism being similar to that heretofore described with reference to wheels 42 and 43. This construction is for the purpose of enabling the machine to move backward without turning the main shaft, and thereby operating in a reverse direction the chopping and cultivating mechanism. The ratchet-wheel 54 is formed with a collar 55, which surrounds the shaft 7 and has a slot therein, through which is passed a pin 56, engaging one of the slots 57 in said shaft. By this means the wheels 52 are laterally adjustable on said shaft for purposes of increasing or decreasing the tread of the machine to accommodate different widths of rows.

A chain or rope 58 connects the rear end of the lever 12 with the rear end of the frame 2, by means of which the said frame 2 may be raised from the ground for purposes of turning or backing the machine or when it is desired not to operate the chopping and cultivating mechanisms.

I have just described a means of independently adjusting both the chopper and the cultivator wheels. This is done in order to provide them with a ready means of being moved backward or forward in order to fit each other's work. Say, for example, the crop is gone over the first time and cut to three inches in the hill and later it is desired to cut it to a stand. The hoes are closed down to one or one and a half inches, and there is the means of cutting it as close as desired. I have also described two plows on the same beam. This is done because there are certain conditions of the cotton crop in the spring that require it. Say, for instance, there is a cold wet backward spring, with cold nights and cold dews, and the cotton draws up, turns red, gets rusty, and begins to die out. It is dangerous to chop it for fear of losing the stand. At the same time it needs working badly. Under such conditions the chopping and cultivating wheels of the machine are removed and a scraper is put on the front foot and a shovel or mold plow on the back foot, the one following the other in a direct line. The crop is now gone over with the machine, scraped and molded up, and allowed to stand until it shows signs of thrift. Then the scraper and molding-plows are taken off, the chopping and cultivating wheels replaced, and the crop chopped and cultivated in the usual manner.

It will thus be seen that I have devised a machine which combines facilities for speed and ease of cultivation such as have never before been known, and which will commend it to all in the line of culture to which it appertains.

I have described my invention in its preferred form; but it is evident that many minor changes might be made therein without departing from the nature or spirit of the invention or sacrificing any of its advantages. All such minor changes are clearly within the scope of the invention and are intended to be covered by this patent.

Having now described my invention, what I claim, and desire to secure by Letters Patent, is—

1. In a machine of the character described, a chopping wheel adapted for rotation in a plane at right angles to the path of the machine, provided with a plurality of radial chopping hoes arranged in pairs, one on each side of said wheel, said hoes having angular cutting edges and the rear hoes of each pair having a cut away portion on its inner edge, substantially as and for the purpose described.

2. In a combined scraping, chopping and cultivating machine, the combination with the main frame mounted on a shaft to which the main wheels are secured, of a double footed plow beam mounted in a collar surrounding said shaft and resting on a cross bar depending from the rear part of the frame, a yoked lever connected to the rear end of said plow beam fulcrumed in brackets on the rear part of the frame, an angle lever fulcrumed to the front part of the frame, having its free arm in engagement with the yoke of said plow lever, and a rod extending from the other arm of said angle lever to the seat of the machine, substantially as and for the purpose described.

In testimony whereof I have signed this specification in the presence of two subscribing witnesses.

JULIUS A. ALEXANDER.

Witnesses:
S. N. CLEVELAND,
I. H. GARRETT.